United States Patent
Ozamoto et al.

(10) Patent No.: US 11,052,339 B2
(45) Date of Patent: Jul. 6, 2021

(54) BACKWASHABLE DEPTH FILTER

(71) Applicants: JNC Corporation, Tokyo (JP); JNC Filter Co., Ltd., Osaka (JP)

(72) Inventors: Kouichi Ozamoto, Shiga (JP); Kento Nakamura, Shiga (JP); Isamu Futase, Shiga (JP); Takumi Kojima, Shiga (JP)

(73) Assignees: JNC Corporation, Tokyo (JP); JNC Filter Co., Ltd., Osaka (JP)

( * ) Notice: Subject to any disclaimer, the term of this patent is extended or adjusted under 35 U.S.C. 154(b) by 0 days.

(21) Appl. No.: 16/321,032

(22) PCT Filed: Jul. 26, 2017

(86) PCT No.: PCT/JP2017/027091
§ 371 (c)(1),
(2) Date: Jan. 27, 2019

(87) PCT Pub. No.: WO2018/021426
PCT Pub. Date: Feb. 1, 2018

(65) Prior Publication Data
US 2019/0160406 A1    May 30, 2019

(30) Foreign Application Priority Data
Jul. 28, 2016  (JP) .............................. JP2016-148535

(51) Int. Cl.
*B01D 39/16*  (2006.01)
*D04H 1/593*  (2012.01)
(Continued)

(52) U.S. Cl.
CPC ......... *B01D 39/1623* (2013.01); *B01D 39/16* (2013.01); *D04H 1/593* (2013.01);
(Continued)

(58) Field of Classification Search
CPC .... B01D 39/1623; B01D 39/16; B01D 35/30; B01D 2313/44; B01D 2239/1208;
(Continued)

(56) References Cited

U.S. PATENT DOCUMENTS

| | | | | |
|---|---|---|---|---|
| 5,876,601 A | * | 3/1999 | Geibel ................. | B01D 29/111 210/493.1 |
| 2010/0206810 A1 | * | 8/2010 | Welch, Jr. ............ | B01J 19/2495 210/650 |
| 2016/0051919 A1 | * | 2/2016 | Nagy ..................... | B01D 39/18 210/505 |

FOREIGN PATENT DOCUMENTS

| | | |
|---|---|---|
| CN | 105102097 | 11/2015 |
| JP | H1119435 | 1/1999 |

(Continued)

OTHER PUBLICATIONS

"Search Report of Europe Counterpart Application", dated Dec. 20, 2019, p. 1-p. 4.

(Continued)

*Primary Examiner* — Madeline Gonzalez
(74) *Attorney, Agent, or Firm* — JCIPRNET (57) ABSTRACT

A hollow cylindrical depth filter formed of fibers of a thermoplastic resin and having a thickness of a filter medium of 5 to 25 millimeters, in which the filter medium has a compression ratio of 0.2 or less when a load of 0.5 MPa is applied thereto, the filter medium has a fiber layer of at least three layers from a fluid inflow side toward an outflow side, porosity of the three layers are adjusted to a specific range, respectively, and intersection points of the fibers forming the filter medium are bonded, a mean interval between the intersection points is 2 to 100 times a mean fiber diameter of the fibers in a length direction, and a ratio of the mean fiber (Continued)

diameter on a surface on an upstream side to the mean fiber diameter on a surface on a downstream side of the filter medium is 0.9 to 1.2.

6 Claims, 1 Drawing Sheet (51) Int. Cl.
*D04H 3/147* (2012.01)
*D04H 3/153* (2012.01)
*B01D 35/30* (2006.01)

(52) U.S. Cl.
CPC ............ *D04H 3/147* (2013.01); *D04H 3/153* (2013.01); *B01D 35/30* (2013.01); *B01D 2313/44* (2013.01)

(58) Field of Classification Search
CPC .... B01D 2239/0216; B01D 2239/0622; B01D 2239/064; B01D 2239/065; B01D 2239/10; B01D 2239/1233; B01D 39/163; B01D 27/148; B01D 29/0047; B01D 29/0052; B01D 29/0054; B01D 29/0059; B01D 29/0075; B01D 29/0079; B01D 29/0081; B01D 39/2017; B01D 39/02; B01D 39/1607; B01D 39/2041; B01D 39/2065; B01D 39/2082; B01D 33/48; B01D 33/44; B01D 2201/08; D04H 1/593; D04H 3/147; D04H 3/153
USPC .... 210/490, 491, 505, 507, 503, 493.1, 108, 210/275, 333.01, 333.1
See application file for complete search history.

(56) References Cited

FOREIGN PATENT DOCUMENTS

| | | |
|---|---|---|
| JP | 2002018218 | 1/2002 |
| JP | 2014004570 | 1/2014 |
| JP | 2015097979 | 5/2015 |
| WO | 0152969 | 7/2001 |

OTHER PUBLICATIONS

"International Search Report (Form PCT/ISA/210) of PCT/JP2017/027091," dated Sep. 12, 2017, with English translation thereof, pp. 1-4.

"Office Action of China Counterpart Application", dated Oct. 26, 2020, with English translation thereof, p. 1-p. 13.

"Office Action of Japan Counterpart Application", dated Dec. 2, 2020, with English translation thereof, p. 1-p. 9.

* cited by examiner

BACKWASHABLE DEPTH FILTER

CROSS-REFERENCE TO RELATED APPLICATION

This application is a 371 application of the international PCT application serial no. PCT/JP2017/027091, filed on Jul. 26, 2017, which claims the priority benefit of Japan application no. 2016-148535, filed on Jul. 28, 2016. The entirety of each of the abovementioned patent applications is hereby incorporated by reference herein and made a part of this specification.

TECHNICAL FIELD

The invention relates to a filter medium for efficiently catching and removing organisms, particularly the organisms having a minimum size of 50 micrometers or more contained in water in a water treatment device for filtering a large amount of water containing the organisms, foreign matters and the like.

BACKGROUND ART

A water treatment device is generally attached with a filter housing, in which microorganisms or foreign matters in water are collected in a cartridge filter mounted therein. The foreign matters can be collected a plurality of times by backwashing the cartridge filter.

A backwashable cartridge filter has been so far limited to a metal cartridge filter. The reason is that a resin cartridge filter or the like has been considered to be weak, and a robust metal cartridge filter has been generally used. For example, Patent literature No. 1 discloses a cylindrical metal mesh filter formed of an inner layer and an outer layer as a filter medium for a seawater treatment device, in which an opening is 30 to 100 micrometers in the inner layer, and 300 to 3000 micrometers in the outer layer. The filter medium in Patent literature No. 1 is disclosed in such a manner that an inner layer filter and an outer layer filter are formed of metal such as nickel-based alloy and seawater-resistant stainless steel, and the inner layer and the outer layer may be united by sintering.

However, the metal filter becomes high in cost, and is also difficult in disposal, and difficult to satisfy both collection performance and ease of backwash, and therefore a filter which is manufactured using an inexpensive material other than the metal, and is backwashable has been required.

Meanwhile, for example, Patent literature No. 2 discloses a cylindrical filter preferable for fluid filtration as a cylindrical resin filter, in which at least one layer of a nonwoven fabric is a melt-blown nonwoven fabric having an average orientation angle of 30 degrees or less relative to a circumferential direction of the cylindrical filter. The invention in Patent literature No. 2 provides a filter low in water passing resistance and long in a filtration life by adjusting an orientation direction of fibers forming the nonwoven fabric within a predetermined range by focusing on difference in passage of particles depending on a shape of openings, when particles of a filtration object are collected in the openings formed of the fibers, in the filter formed of the nonwoven fabric. However, such a filter is assumed to pass water therethrough only in one direction, in which, if backwash is performed, a problem of incapability of maintaining a filter shape has remained by application of back pressure particularly to an outermost layer of the filter.

CITATION LIST

Patent Literature

Patent literature No. 1: JP 2014-4570 A
Patent literature No. 2: WO 01/52969 A

SUMMARY OF INVENTION

Technical Problem

In view of the actual situation described above, the invention provides a backwashable resin filter used in a water treatment device.

Solution to Problem

In order to solve the problem described above, the present inventors have diligently continued to conduct research on the premise that a depth filter formed of fibers of a thermoplastic resin is adopted as a filter medium. Then, the present inventors have found that the problem can be solved by forming the depth filter into a configuration of at least three layers, and further adjusting porosity of the three layers to a specific range, respectively, and forming the configuration having specific physical properties, and have completed the invention based on the finding.

The invention includes structure as described below.

Item 1. A hollow cylindrical depth filter formed of fibers of a thermoplastic resin and having a thickness of a filter medium of 5 to 25 millimeters, wherein
the filter medium has a compression ratio of 0.2 or less when a load of 0.5 MPa is applied thereto,
the filter medium has a fiber layer of at east three layers from a fluid inflow side toward an outflow side,
porosity of a first layer on the fluid inflow side is in a range of 0.70 to 0.85,
porosity of a second layer on the fluid inflow side is in a range of 0.60 to 0.80,
porosity of a third layer on the fluid inflow side is in a range of 0.70 to 0.85,
a relation: the porosity of the first layer > the porosity of the second layer is satisfied,
a relation: the porosity of the third layer > the porosity of the second layer is satisfied,
intersection points of the fibers forming the filter medium are bonded,
a mean interval between the intersection points is 2 to 100 times a mean fiber diameter of the fibers in a length direction, and
a ratio of the mean fiber diameter on a surface on an upstream side to the mean fiber diameter on a surface on a downstream side of the filter medium is 0.9 to 1.2.

Item 2. The depth filter according to item 1, wherein a degree of deformation during backwash is less than 0.05.

Item 3. The depth filter according to item 1 or 2, wherein filtration rating is 5 to 60 micrometers.

Item 4. The depth filter according to any one of items 1 to 3, wherein the fibers are thermo-fusible fibers.

Item 5. The depth filter according to item 4, wherein the thermo-fusible fibers are conjugate fibers formed of two kinds of thermoplastic resins having a melting point difference of 10° C. or more.

Item 6. The depth filter according to item 4, wherein the thermo-fusible fibers are combined fibers of two kinds of thermoplastic fibers having a melting point difference of 10° C. or more.

Item 7. The depth filter according to item 1, wherein an outer layer portion of a cylinder is stronger in adhesion in comparison with an inside thereof.

Advantageous Effects of Invention

A depth filter of the invention has strength withstanding backwash, and upon being used in a water treatment device, can discharge foreign matters caught by filtration by backwashing the depth filter. More specifically, the depth filter of the invention is backwashed and regenerated to allow a plurality of times of filtration. Moreover, the depth filter of the invention is made of a resin, and more advantageous in cost than a conventional metal filter.

DESCRIPTION OF EMBODIMENTS

Depth Filter

A depth filter of the invention is a hollow cylindrical depth filter formed of fibers of a thermoplastic resin and having a thickness of a filter medium of 5 to 25 millimeters, in which the filter medium has a compression ratio of 0.2 or less when a load of 0.5 MPa is applied thereto, the filter medium has a fiber layer of at least three layers from a fluid inflow side toward an outflow side, porosity of a first layer on the fluid inflow side is in the range of 0.70 to 0.85, porosity of a second layer on the fluid inflow side is in the range of 0.60 to 0.80, porosity of a third layer on the fluid inflow side is in the range of 0.70 to 0.85, a relation: the porosity of the first layer > the porosity of the second layer is satisfied, a relation: the porosity of the third layer > the porosity of the second layer is satisfied, intersection points of the fibers forming the filter medium are bonded, a mean interval between the intersection points is 2 to 100 times a mean fiber diameter of the fibers in a length direction, and a ratio of the mean fiber diameter on a surface on an upstream side to the mean fiber diameter on a surface on a downstream side of the filter medium is 0.9 to 1.2.

The depth filter of the invention has the fiber layer of at least three layers, and may be provided with any other layer on a surface layer of an inner layer of the fiber layer of the three layers as long as advantageous effects of the invention can be produced.

The depth filter of the invention has the fiber layer of at least three layers of the first layer, the second layer and the third layer from the fluid inflow side toward the outflow side of the filter medium, in which the porosity of the first layer on the fluid inflow side is in the range of 0.70 to 0.85, the porosity of the second layer on the fluid inflow side is in the range of 0.60 to 0.80, and the porosity of the third layer on the fluid inflow side is in the range of 0.70 to 0.85. Here, the porosity means a ratio of voids per unit volume, which is expressed in terms of percentage, and details of a measuring and calculating method will be described in Examples described later. In order to form such a configuration, the porosity only needs to be adjusted in such a manner that the porosity of the second layer is decreased than the porosity of the first layer, the porosity of the third layer is increased than the porosity of the second layer, and the porosity of the third layer becomes substantially equal to the porosity of the first layer. The porosity may be the same or different between the first layer and the third layer, and when the porosity is different, a difference in the porosity from each other is preferably within 0.15. In order to control the porosity, processing conditions when each fiber layer is formed only need to be appropriately adjusted. Foreign matters and the like caught in the filter medium are mainly accumulated in the first layer and become hard to be accumulated in the second layer being an inside of the filter medium by decreasing the porosity of the second layer than the porosity of the first layer, and therefore particles are easily washed away by backwash. Moreover, clogging of the second layer from a side of the third layer can be prevented by meeting the porosity of the third layer with the porosity of the first layer, even when backwash is performed by using seawater. When any other layer is further provided in addition to the first layer to the third layer, for example, a net layer can be provided further outside the first layer (uppermost layer of the filter). Alternatively, a further filtration layer having different porosity can also be provided between the first layer and the second layer and/or between the second layer and the third layer.

The fibers used for the filter medium of the depth filter are composed of the thermoplastic resin. The thermoplastic resin is not particularly limited as long as the resin can form the filter having the configuration of the invention, and specific examples thereof can include polyamide, polyester, low-melting point copolyester, polyvinylidene chloride, polyvinyl acetate, polystyrene, polyurethane elastomer, polyester elastomer, polypropylene, polyethylene and a polypropylene copolymer. The thermoplastic resin may be used alone, or a mixture of two or more kinds of the thermoplastic resins may be used. Further, the thermoplastic resin may contain various functional agents in the range in which the advantageous effects of the invention are not adversely affected, and specific examples thereof can include an antibacterial agent, a deodorant, a hydrophilizing agent, a water-repellent agent and a surfactant.

The fibers may be single component fibers composed of a single resin component, or may be conjugate fibers composed of two or more components of resin components. Moreover, the fibers may be mixed fibers formed by mixing at least two fibers selected from the group of the single component fibers and the conjugate fibers. In the two or more components of resin components forming the conjugate fibers and the mixed fibers, a melting point difference among the respective components is preferably at least 10° C. or more. If the melting point difference is 10° C. or more, a risk of causing softening or melting of a high-melting point component into forming a film is low, when a thermally bonded portion is formed in manufacture of the filter medium of the filter, or the intersection points of the fibers are bonded (fused), and the filter is not formed into the film to flatten a pore diameter, resulting in causing no significant influence on the filtration rating, such as reduction of water passage, and such a case is preferred. A cross-sectional shape of the fiber is not limited, and may be a circle, a non-circle or the like.

The melting point of a fiber component herein generally refers to a temperature that can be measured by a differential scanning calorimeter (DSC), and appears as an endothermic peak in a DSC measurement chart. In the case of low-melting point amorphous copolyester or the like, the melting point does not necessarily appear clearly, and therefore a point generally referred to as a softening point is used as a substitute therefor, and a differential thermal analysis (DTA) or the like is used for measurement.

When the mixed fibers or the conjugate fibers are adopted as the fibers forming the filter medium, specific examples of a combination of the respective resin components forming the mixed fibers and the conjugate fibers can include a combination of two kinds of polypropylene having different melting points, a combination of polyethylene and polypropylene, a combination of low-melting point copolyester and polyester, and a combination of polyethylene and polyester, but not limited thereto.

In view of adhesion between the fibers and formability of the filter, in the case of the mixed fibers, a ratio of a low-melting point component is preferably 30 wt % or more and less than 70 wt %, and in the case of the conjugate fibers, a ratio of the low-melting point component is preferably 30 wt % or more and less than 70 wt %. A form of the conjugate fibers is not limited, and may have any structure such as a concentric sheath-core structure, an eccentric sheath-core structure and a side-by-side structure.

The depth filter of the invention has features in which the thickness of the filter medium is 5 to 25 millimeters. If the thickness of the filter medium is 5 millimeters or more, such a thickness is favorable in view of easily exhibiting an effect of providing the first layer to the third layer, and if the thickness is within 25 millimeters, such a thickness is preferred in view of no necessity of excessively increasing pressure used for backwash. The thickness of the filter medium is further preferably 7 to 20 millimeters, and if the thickness is within the range, such a thickness is further preferred in view of being able to sufficiently collect the particles and being formed into a size at which the filter medium can be easily exchanged by a human hand.

A portion formed in the smallest mean fiber diameter in the filter medium is desirably provided in the second layer. A range of the smallest mean fiber diameter is 0.1 to 100 micrometers. If the value is 0.1 micrometer or more, reduction of a filtration life caused by particles other than organisms contained in water can be prevented. Moreover, if the value is 100 micrometers or less, the porosity for achieving the required filtration rating can be set to a properly high level, and therefore reduction of the filtration life can be prevented. If the value is in the range of 30 to 70 micrometers, when the organisms having a minimum size of 50 micrometers or more contained in water are removed, both collection efficiency and fluid passage can be satisfied, and therefore such a case is preferred. Moreover, a thickness of the portion having the smallest mean fiber diameter desirably exists in 2 millimeters or more. A term "portion of the smallest mean fiber diameter" herein means a portion in which the mean fiber diameter is in the range of 1 to 1.2 times the smallest mean fiber diameter. Existence of the thickness in 2 millimeters or more is preferred in view of being able to reliably collect the organisms intended to be collected.

Moreover, the depth filter of the invention has features in which the ratio of the mean fiber diameter on the surface of the filter medium on the upstream side to the mean fiber diameter on the surface on the downstream side is 0.9 to 1.2. The mean fiber diameter on the surface on the upstream side means the mean fiber diameter determined by observing a surface of the filter medium on the fluid inflow side by means of a microscope, and the mean fiber diameter on the surface on the downstream side means the mean fiber diameter determined by observing a surface of the filter medium on the fluid outflow side by means of the microscope. In the depth filter of the invention, typically, filtration is performed in an aspect in which a fluid inflows from an outside of the cylinder and outflows from an inner surface of the cylinder, and therefore the surface on the upstream side serves as an outer surface having a hollow cylindrical shape, and the surface on the downstream side serves as a surface having the hollow cylindrical shape on an inner wall side. The ratio of the mean fiber diameter is calculated by dividing a value of the mean fiber diameter on the surface on the upstream side by a value of the mean fiber diameter on the surface on the downstream side, and the value is preferably 0.9 to 1.2. In other words, the value of the mean fiber diameter on the surface on the upstream side is desirably close to the value of the mean fiber diameter on the surface on the downstream side. When a filtration object is seawater, backwash is performed by using seawater in many cases, and the ratio of the mean fiber diameter adjusted to the above range is preferred in view of being able to prevent the surface on the downstream side from clogging by the particles in seawater during backwash, or conversely preventing large particles in seawater from entering into the filter medium.

Moreover, the depth filter of the invention has features in which the intersection points of the fibers forming the filter medium are bonded in the filter medium, and the mean interval between the intersection points is 2 to 100 times the mean fiber diameter of the fibers in the length direction. Bonding of the intersection points of the fibers can be formed by thermal fusion, for example. The mean interval between the intersection points of the fibers is an indicator representing a degree of strength of pores formed in the filter medium of the filter. If the value is 100 times or less, deformation of the pores by filtration pressure or pressure during backwash is small. Moreover, when the value is 2 times or more, the filter having sufficient fluid passage and particle holding capacity is formed. The mean interval between the intersection points of the fibers is calculated according to a method described in detail in Examples described later.

Further, the depth filter of the invention has features in which the compression ratio when the load of 0.5 MPa is applied to the filter medium is 0.2 or less. The compression ratio of the filter medium is an indicator representing ease of deformation of the filter medium against a continual load from outside, and if the compression ratio when the load of 0.5 MPa is applied thereto is 0.2 or less, almost no deformation by the filtration pressure and the pressure during backwash is caused, and therefore such a case is preferred.

Moreover, in the depth filter of the invention, a degree of deformation during backwash is preferably less than 0.05. The degree of deformation during backwash means a degree at which the filter is deformed when water is passed through the filter in a direction reverse to the direction during ordinary use (typically, from an inner direction to an outer direction of the filter), and a specific measuring method is as described in Examples described later. If the degree of deformation is less than 0.05, such a case is preferred in view of causing no damage on the filter medium during backwash and maintaining stable filtration performance. If the degree of deformation becomes 0.05 or more, the filter medium is damaged, and also the filter is temporarily or permanently out of an attachment position, and efficient backwash becomes unable to be made, or the filtration performance is influenced even when the filter is returned to the ordinary use in several cases.

Moreover, in the depth filter of the invention, the filtration rating is preferably 5 to 60 micrometers. The filtration rating used herein means a particle size at which the correction efficiency becomes 90% upon filtering powder having a specific particle size distribution, and a specific measuring method will be described in Examples described later. While the depth filter of the invention is preferably used in the water treatment device, if the filtration performance required for the water treatment device is taken into consideration, the filtration rating is suitably 5 to 60 micrometers. The filtration rating can be adjusted by controlling the thickness of the filter medium, the porosity, the interval between the intersection points of the fibers or the like.

Method for Manufacturing a Depth Filter

The depth filter of the invention can be manufactured as described below, for example.

When melt-blown fibers are used as the fibers forming the filter medium, a kind and a manufacturing method thereof are not particularly limited, and a publicly-known method of manufacturing a melt-blown nonwoven fabric can be used. For example, the melt-blown nonwoven fabric is manufactured by melting and extruding a thermoplastic resin, spinning the resulting material from a spinneret for melt-blow, blow spinning the resulting material as a fiber flow by a high-temperature and high-speed gas, collecting the fibers as a web by a collecting device, and heat-treating the web obtained to thermally fuse the fibers. As the high-temperature and high-speed gas used in the melt-blow spinning, a gas such as air and a nitrogen gas is ordinarily used. A temperature and pressure of the gas are generally used in the range of 200 to 500° C. and in the range of 0.01 to 0.65 MPa, respectively.

As the melt-blown nonwoven fabric, a melt-blown nonwoven fabric formed of single constituent fibers, a melt-blown nonwoven fabric formed of the conjugate fibers, a melt-blown nonwoven fabric formed of the combined fibers, or the like can be used, and the melt-blown nonwoven fabric formed of the thermo-fusible conjugate fibers or the combined fibers is preferred. Moreover, the melt-blown nonwoven fabric may be subjected to secondary processing for providing the fabric with a function in the range in which an effect thereof is not adversely affected, and specific examples thereof can include coating treatment for hydrophilizing or hydrophobing the fabric, chemical treatment for introducing a specific functional group into a surface of the fibers forming the melt-blown nonwoven fabric, and sterilization treatment.

When the thermo-fusible conjugate fibers or the combined fibers are used, the hollow cylindrical depth filter can be formed by heating the web of the fibers manufactured according to a melt-blowing method at a temperature higher than a melting point of the fibers of the low-melting point component to thermally fuse the low-melting point component. Formation using the web includes a method in which, after fibers are spun, while a web is continuously heated, the web is wound around a core and thermally bonded and formed into the depth filter by using a forming device having a conveyor, a heater and a winder, a method in which a web is wound up around a core, and then the web is unwound therefrom, and wound around another core, and thermally bonded and formed thereinto, and a method in which a web is heated and melted, and once wound up as a nonwoven fabric, and then the nonwoven fabric is wound around a core again in a heated and melted state, and thermally bonded and formed thereinto. In addition, a metal center core or the like is removed after formation.

Thus, the method in which the web is once wound as the nonwoven fabric is a method in which the fibers according to the melt-blowing method in the web is thermally bonded into a surface nonwoven fabric, and then heating the nonwoven fabric is heated again, wound around the core in the melted state, and wound nonwoven fabrics are thermally bonded and formed into the hollow cylindrical shape. Specific examples of the method of heating the web include a heat embossing method, a heat calender method, a hot air method, an ultrasonic bonding method and a far-infrared heating method.

Figure 1A:
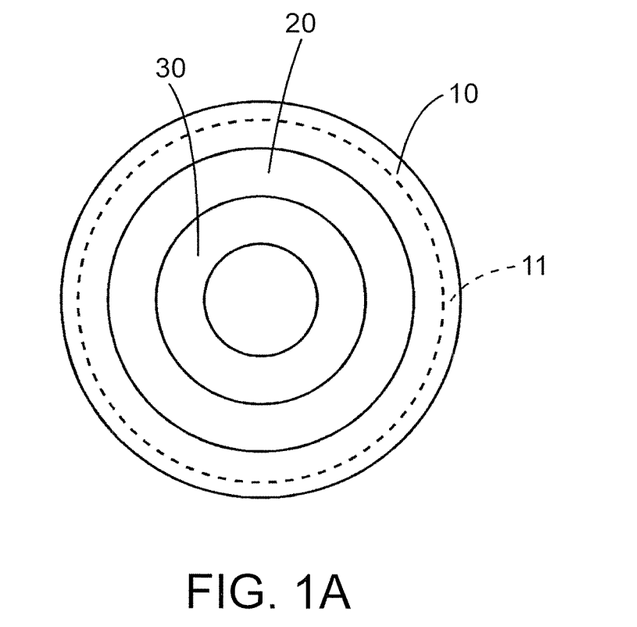
FIG. 1A is a schematic drawing showing a top view of the hollow cylindrical filter medium of the invention.
Figure 1B:
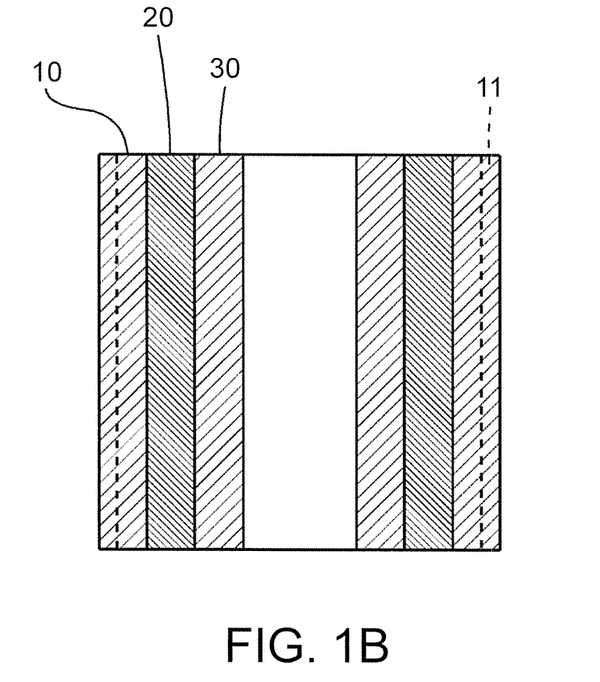
FIG. 1B is a schematic drawing showing a cross-sectional view of the hollow cylindrical filter medium of the invention.

Referring to FIGS. 1A and 1B, in order to form the depth filter having the fiber layer of three layers, the fibers obtained by the melt-blowing method are applied as the web, and the web is wound up around a columnar metal rod while being thermally press-bonded to form the third layer 30 serving as the core. Then, winding conditions are changed, in which the web is wound up therearound with density higher than the density of the third layer 30 to form the second layer 20 (filtration layer). Finally, the winding conditions are returned to the same conditions as in the third layer 30, and the web is wound up therearound, and the first layer 10 (skin layer) can be formed.

The filter of the invention is prepared by winding up the nonwoven fabric around the columnar metal rod while being thermally press-bonded. On the occasion, the nonwoven fabric is preferably wound with strong adhesion strength on the outer surface and the inner surface of the cylindrical filter, and with comparatively low adhesion strength in other places. An expression "wound with comparatively low adhesion strength" herein means strength to a degree at which, when the filter medium thermally press-bonded is intended to be compulsorily peeled again, interlayer adhesion strength is lower in comparison with adhesion strength of the nonwoven fabric itself, and thus the nonwoven fabric can be peeled without being broken. Conversely, an expression "with strong adhesion strength" means strength to a degree at which, even if the filter medium thermally press-bonded is intended to be compulsorily peeled again, the interlayer adhesion strength is strong comparably thereto in comparison with the adhesion strength of the nonwoven fabric itself, and thus the nonwoven fabric is hard to be peeled without being broken. As described above, the adhesion strength is better as the adhesion strength is higher in the meaning of preventing deformation of the filter medium, but if the adhesion strength is excessive, the fluid passage is inhibited or the filtration life is shortened in several cases. Therefore, the adhesion strength of the surface of the filter medium to be significantly influenced when the filter medium is deformed is preferably increased, and the adhesion strength inside the filter medium is preferably comparatively decreased in order to ensure the fluid passage. The place having the high adhesion strength is desirably provided to a thickness of about 0.5 to about 3 millimeters from the outer surface (the portion 11 of the thickness of 0.5 to 3 millimeters from the outer surface of the hollow cylindrical filter medium in FIGS. 1A and 1B). When the thickness is 0.5 millimeter or more, a purpose of suppressing deformation of the surface of the filter medium can be achieved.

When the thermo-fusible fibers are used as the fibers forming the nonwoven fabric, the columnar metal rod is preferably heated in order to strongly adhere the inner surface of the filter medium. The heating temperature is preferably adjusted to conditions in which a shape of the fibers is not excessively broken and the surface is provided with sufficient adhesion strength. When two kinds of thermoplastic resins having a melting point difference of 10° C. or more are used, the temperature to be set is desirably set to a middle between two melting points. In order to further strengthen the adhesion, after the metal rod is removed, the filter medium may be further heated by passing hot air therethrough.

Moreover, when the thermo-fusible fibers are used, the surface is desirably heated in order to strongly adhere the outer surface of the filter medium. As a method of heating the surface, hot air can be blown from the surface, or the filter medium can be put in a heated mold for a short period of time, or the cylinder can be rotated on a heated plate.

The filter medium of the filter manufactured as described above is cut into a suitable size, and the resulting material is preferably used as the hollow cylindrical depth filter. The depth filter is ordinarily formed into the hollow cylindrical shape having an inner diameter of about 25 millimeters to about 160 millimeters, an outer diameter of about 55 millimeters to about 200 millimeters and a thickness of about 5 millimeters to about 25 millimeters. Moreover, only an outline is described as the manufacturing method described above, and in addition to the steps described above, a publicly-known step such as heat treatment, cooling, chemical treatment, molding and washing can be performed, when necessary.

Moreover, in the above description, if the fibers having a large fiber diameter are prepared according to the melt-blowing method, a phenomenon (generally, called "roping") in which the fibers are excessively entangled occurs, and the nonwoven fabric obtained has excessively high porosity in several cases. The roping occurs in the melt-blowing method when the mean fiber diameter reaches approximately 20 micrometers or more, which depends on a resin to be used or manufacturing conditions. Moreover, the melt-blown nonwoven fabric is generally collected on a porous body having air permeability, such as a conveyor net and a suction drum, and therefore an uneven pattern of the porous body is transferred also onto the surface of the nonwoven fabric to further increase the thickness of the nonwoven fabric in many cases. If the filter is prepared by winding such a nonwoven fabric, final porosity is increased, or pressure resistance of the filter is reduced, or deformation during backwash is increased in several cases.

Then, a rotary cylindrical body having a smooth surface is installed between the spinneret and a suction conveyor or the suction drum on which the thermoplastic fibers are collected, and when part of all the fibers of the spun thermoplastic fibers is in a semi-solidified state, the thermoplastic fibers are brought into direct contact with an inclined surface portion of the rotary cylindrical body, and then the thermoplastic fibers are moved and collected on the suction conveyor downward, thereby causing smoothing of the surface of the nonwoven fabric and simultaneously reduction of the porosity of the nonwoven fabric. The reason is that the fibers are collected in the semi-solidified state, and therefore the nonwoven fabric is flattened by self-weight, and the porosity is suppressed, and simultaneously a smooth pattern of the rotary cylindrical body is transferred onto the surface of the nonwoven fabric, and the porosity is further reduced. Smoothing of the nonwoven fabric or control of the porosity can be performed according to such a method.

EXAMPLES

Examples described below are for illustrative purpose only. The scope of the invention is not limited by the present Examples.

In addition, evaluation of physical properties in the invention was performed according to a method described below.

Porosity

Each layer was cut out into a cylindrical form from a filter, and an outer diameter (cm), an inner diameter (cm), a length (cm) and weight (g) of the layer were measured. An apparent volume of the layer was calculated from the above values according to an expression described below.

{(Outer diameter)×(outer diameter)−(inner diameter)×(inner diameter)}/4×3.14×length (X)

Next, a volume of a resin forming a filter medium was calculated from the weight and specific gravity (g/cm$^3$) of the resin.

Weight/specific gravity (Y)

Porosity was calculated by using the above values according to an expression described below.

(1−Y/X)×100%

Mean Fiber Diameter of a Single Fiber

A diameter of a fiber was measured on 100 fibers by means of an electron microscope, and an arithmetic mean value thereof was taken as a mean fiber diameter. The calculation was performed by using image processing software "Scion Image" made by Scion Corporation.

Interval Between Intersection Points of the Fibers

A second layer was cut out from the filter (for a single layer structure in Comparative Examples, the layer was cutout), and a surface of the filter medium was photographed by means of an electron microscope, and a fiber length between intersection points of the fibers was measured. A value obtained by dividing the measured fiber length by a diameter of fibers between the intersection points of the fibers was taken as an interval between the intersection points of the fibers. The above value was measured on 100 points, and an arithmetic mean value thereof was taken as a mean interval between the intersection points of the fibers.

Filtration Rating

One filter was attached to a housing of a circulating filtration performance tester, and water was passed and circulated through the filter from a water tank for 50 L by a pump in such a manner that water flowed from an outside to an inside of a cylinder. A flow rate was adjusted to 30 L per minute, and then seven kinds of JIS powder being standard powder for basic physical properties as testing powder of the water tank were continuously added thereto in amount of 0.2 g per minute. Then, a stock solution and a filtrate were sampled after 5 minutes from starting of addition, and the number of particles (A) contained in the stock solution was counted using a light blocking particle detector. Then, the resulting number was compared with the number of particles (B) collected by the filter for each particle having each particle size, and a value calculated according to a formula= (B/A×100%) was taken as collection efficiency. The value was analyzed, and a particle size at which the collection efficiency becomes 90% was taken as filtration rating.

Degree of Deformation During Backwash

While the filter after measurement of the filtration rating was kept attached to the housing of the circulating filtration performance tester, an outer diameter of the filter was measured in a state in which the flow rate was adjusted to 30 L per minute in such a manner that water flowed from the inside to the outside of the cylinder, and the value was taken as an outer diameter during backwash. A degree of deformation during backwash was calculated by using the value and a formula described below.

(Degree of deformation during backwash)={(outer diameter during backwash) −(original outer diameter)}/(original outer diameter)

Compression Ratio

A filter medium was cut into a small piece having a dimension of 20 mm×20 mm, and an original thickness was measured, and subsequently a thickness of the small piece when a load of 0.5 MPa was applied thereto was measured.

A compression ratio was calculated by using the thickness obtained and a formula described below.

(Compression ratio)={(initial thickness)−(thickness when a load was applied thereto)}/(initial thickness)

Example 1

Polypropylene (MFR: 68 g/10 min (230° C.), mp.: 165° C.) as a high-melting point component and propylene/ethylene/butene-1 terpolymer (MFR: 73 g/10 min (190° C.), mp.: 135° C.) as a low-melting point component were extruded at a spinning temperatures of 290° C. and 270° C., respectively, and a combined fiber ratio of 50:50 by using a spinneret for combined fiber melt-blowing, in which spinning holes having a hole diameter of 0.3 mm for the high-melting point component, and spinning holes having a hole diameter of 0.3 mm for the low-melting point component were alternately arranged at a hole number ratio of 1:1. Heated air at 380° C. was blown at a pressure of 0.08 MPa, and directly collecting the resulting fibers on a suction conveyor net A to manufacture combined fiber melt-blown nonwoven fabric A having a basis weight of 40 g/m². Nonwoven fabric A obtained had a mean fiber diameter of 50 μm. Then, heated air was blown under the same conditions as in nonwoven fabric A, and fibers formed into fine fibers were accumulated on a surface of a stainless steel rotary roll having an outer diameter of 120 mm installed under nozzles and in parallel to the nozzles, and then were collected on the suction conveyor net to manufacture combined fiber melt-blown nonwoven fabric B having a basis weight of 40 g/m². Nonwoven fabric B obtained had a mean fiber diameter of 50 μm. Then, nonwoven fabric A was heated by an air-through dryer, and in a state in which the low-melting point component was melted, wound around a stainless steel pipe having an outer diameter of 30 mm until the outer diameter reached 40 mm. Then, nonwoven fabric B was heated by the air-through type dryer, and in the state in which the low-melting point component was melted, wound therearound in a further outer position of nonwoven fabric A just wound until the outer diameter reached 52 mm. Then, nonwoven fabric A was heated by the air-through dryer, and in the state where the low-melting point component was melted, wound therearound in a further outer position of nonwoven fabric B just wound until the outer diameter reached 62 mm. Then, a material wound around the stainless steel pipe was placed on a roll heated to a temperature of 150° C., and the material wound was heated by rotating both the stainless steel pipe and the roll. Then, the stainless steel pipe was removed, and then the material was cut into a length of 250 mm to form a hollow cylindrical filter having an outer diameter of 62 mm, an inner diameter of 30 mm and a length of 250 mm.

Comparative Example 1

Nonwoven fabric A was prepared in the same manner as in Example 1, and nonwoven fabric A was heated by an air-through type dryer, and in a state in which a low-melting point component was melted, wound around a stainless steel pipe having an outer diameter of 30 mm until the outer diameter reached 62 mm. Then, a material wound around the stainless steel pipe was placed on a roll heated to a temperature of 150° C., and the material wound was heated by rotating both the stainless steel pipe and the roll. Then, the stainless steel pipe was removed, and then the material was cut into a length of 250 mm to form a hollow cylindrical cartridge filter having an outer diameter of 62 mm, an inner diameter of 30 mm and a length of 250 mm. The filter was comparatively soft and large in deformation during backwash.

Comparative Example 2

Polypropylene (MFR: 68 g/10 min (230° C.), mp.: 165° C.) was extruded at a spinning temperature of 290° C. by using a spinneret having a hole diameter of 0.3 mm for single component melt-blowing. Heated air having a temperature of 383° C. was blown at a pressure of 0.08 MPa, and fibers were directly collected on a suction conveyor net A to manufacture combined fiber melt-blown nonwoven fabric having a basis weight of 40 g/m². The nonwoven fabric obtained had a mean fiber diameter of 50 μm. Moreover, almost no intersection points of the fibers were observed, and an interval between the intersection points was clearly more than 100 times. Next, the nonwoven fabric was heated by an air-through type dryer, and wound around a polypropylene porous pipe having an inner diameter of 30 mm and an outer diameter of 35 mm until the outer diameter reached 62 mm. A winding end portion was adhered by heat seal, and the resulting material was cut into a length of 250 mm to form a hollow cylindrical cartridge filter having an outer diameter of 62 mm, an inner diameter of 30 mm and a length of 250 mm. The above filter was significantly soft and significantly large in deformation during backwash.

Example 2

A filter was prepared under the same conditions as in Example 1 except that a spinning temperature was adjusted to 300° C. and 280° C., respectively, and a temperature of heated air was adjusted to 390° C. Both nonwoven fabric A and nonwoven fabric B had a mean fiber diameter of 30 μm.

Example 3

A hollow cylindrical cartridge filter having an outer diameter of 62 mm, an inner diameter of 30 mm and a length of 250 mm was prepared in the same manner as in Example 1 for all except that the step of heating the material on the roll heated to the temperature of 150° C. was omitted. In the filter, while part of a nonwoven fabric wound around an outermost layer of the filter was peeled during backwash, backwash was able to be performed.

The results of evaluation of physical properties of the filters in Examples 1 to 3 and Comparative Examples 1 and 2 are shown in Table 1.

TABLE 1

|  | Melting point ° C. | | | | Deformation | Thickness mm | | | |
|---|---|---|---|---|---|---|---|---|---|
|  | Raw material resin 1 | Raw material resin 2 | Melting point difference | Compression ratio | during backwash | First layer | Second layer | Third layer | Whole |
| Example 1 | 165 | 135 | 30 | 0.13 | 0 | 5 | 6 | 5 | 16 |
| Example 2 | 165 | 135 | 30 | 0.13 | 0 | 5 | 6 | 5 | 16 |
| Example 3 | 165 | 135 | 30 | 0.13 | 0.02 | 5 | 6 | 5 | 16 |
| Comparative Example 1 | 165 | 135 | 30 | 0.21 | 0.05 | 16 | — | — | 16 |
| Comparative Example 2 | 165 | — | — | 0.46 | 0.13 | 16 | — | — | 16 |

|  | Porosity % | | | | Mean fiber diameter mm | | | Mean interval between intersection points | Filtration rating μm | Backwash |
|---|---|---|---|---|---|---|---|---|---|---|
|  | First layer | Second layer | Third layer | Mean | First layer | Second layer | Third layer | | | |
| Example 1 | 0.81 | 0.75 | 0.81 | 0.788 | 50 | 50 | 50 | 20 | 50 | Good |
| Example 2 | 0.81 | 0.75 | 0.81 | 0.788 | 30 | 30 | 30 | 25 | 50 | Good |
| Example 3 | 0.81 | 0.75 | 0.81 | 0.788 | 50 | 50 | 50 | 20 | 50 | Good |
| Comparative Example 1 | 0.81 | — | — | 0.81 | 50 | — | — | 20 | 55 | Poor |
| Comparative Example 2 | 0.85 | — | — | 0.85 | 50 | — | — | >100 | 50 | Poor |

INDUSTRIAL APPLICABILITY

A depth filter of the invention is formed only of fibers composed of a thermoplastic resin without using metal, and therefore can be applied as a backwashable resin filter with a low cost. Moreover, a resin filter has lighter weight in comparison with a metal filter, and therefore a weight load applied to a filtration device or facilities in general can be reduced. The depth filter of the invention is preferably used as a filter of a freshwater treatment device and a seawater treatment device.

What is claimed is:

1. A hollow cylindrical depth filter formed of fibers of a thermoplastic resin and having a thickness of a hollow cylindrical filter medium of 5 to 25 millimeters, wherein
the depth filter has an outer surface of the hollow cylindrical filter medium on a fluid inflow side and an inner surface of the hollow cylindrical filter medium on a fluid outflow side, and the depth filter can be backwashed by flowing liquid from the inner surface to the outer surface,
the hollow cylindrical filter medium has a compression ratio of 0.2 or less when a load of 0.5 MPa is applied thereto,
the hollow cylindrical filter medium has a fiber layer of at least three layers from the outer surface on the fluid inflow side toward the inner surface on the fluid outflow side,
a porosity of a first layer on the fluid inflow side is in a range of 0.70 to 0.85,
a porosity of a second layer on the fluid inflow side is in a range of 0.60 to 0.80,
a porosity of a third layer on the fluid inflow side is in a range of 0.70 to 0.85,
wherein the porosity of the first layer is greater than the porosity of the second layer,
wherein the porosity of the third layer is greater than the porosity of the second layer,
intersection points of the fibers forming the hollow cylindrical filter medium are bonded,
a mean interval between the intersection points is 2 to 100 times a mean fiber diameter of the fibers in a length direction,
a ratio of the mean fiber diameter on a surface on an upstream side to the mean fiber diameter on a surface on a downstream side of the hollow cylindrical filter medium is 0.9 to 1.2,
a portion of a thickness of 0.5 to 3 millimeters from an outer surface of the hollow cylindrical filter medium is wound and thermally press-bonded to have a strong adhesion strength that the fiber layer cannot be peeled without being broken, while other portion of the hollow cylindrical filter medium is wound with a low adhesion strength that the fiber layer can be peeled without being broken, and
the portion of the thickness of 0.5 to 3 millimeters from the outer surface of the hollow cylindrical filter medium is a portion of the first layer of the fiber layer of the hollow cylindrical filter medium.

2. The depth filter according to claim 1, wherein a degree of deformation during backwash is less than 0.05,
the degree of deformation during backwash is measured by using a formula below, and an outer diameter of depth filter during backwash is measured in a state in which a water flow rate is adjusted to 30 L per minute in such a manner that water flowed from an inside to an outside of the depth filter:

(degree of deformation during backwash)={(outer diameter of depth filter during backwash)−(original outer diameter of depth filter)}/(original outer diameter of depth filter).

3. The depth filter according to claim 1, wherein filtration rating is 5 to 60 micrometers,
the filtration rating is a particle size at which a collection efficiency becomes 90% upon filtering.

4. The depth filter according to claim 1, wherein the fibers are thermo-fusible fibers.

5. The depth filter according to claim 4, wherein the thermo-fusible fibers are conjugate fibers formed of two kinds of thermoplastic resins having a melting point difference of 10° C. or more.

6. The depth filter according to claim 4, wherein the thermo-fusible fibers are combined fibers of two kinds of thermoplastic fibers having a melting point difference of 10° C. or more.

* * * * *